United States Patent Office 3,344,921
Patented Oct. 3, 1967

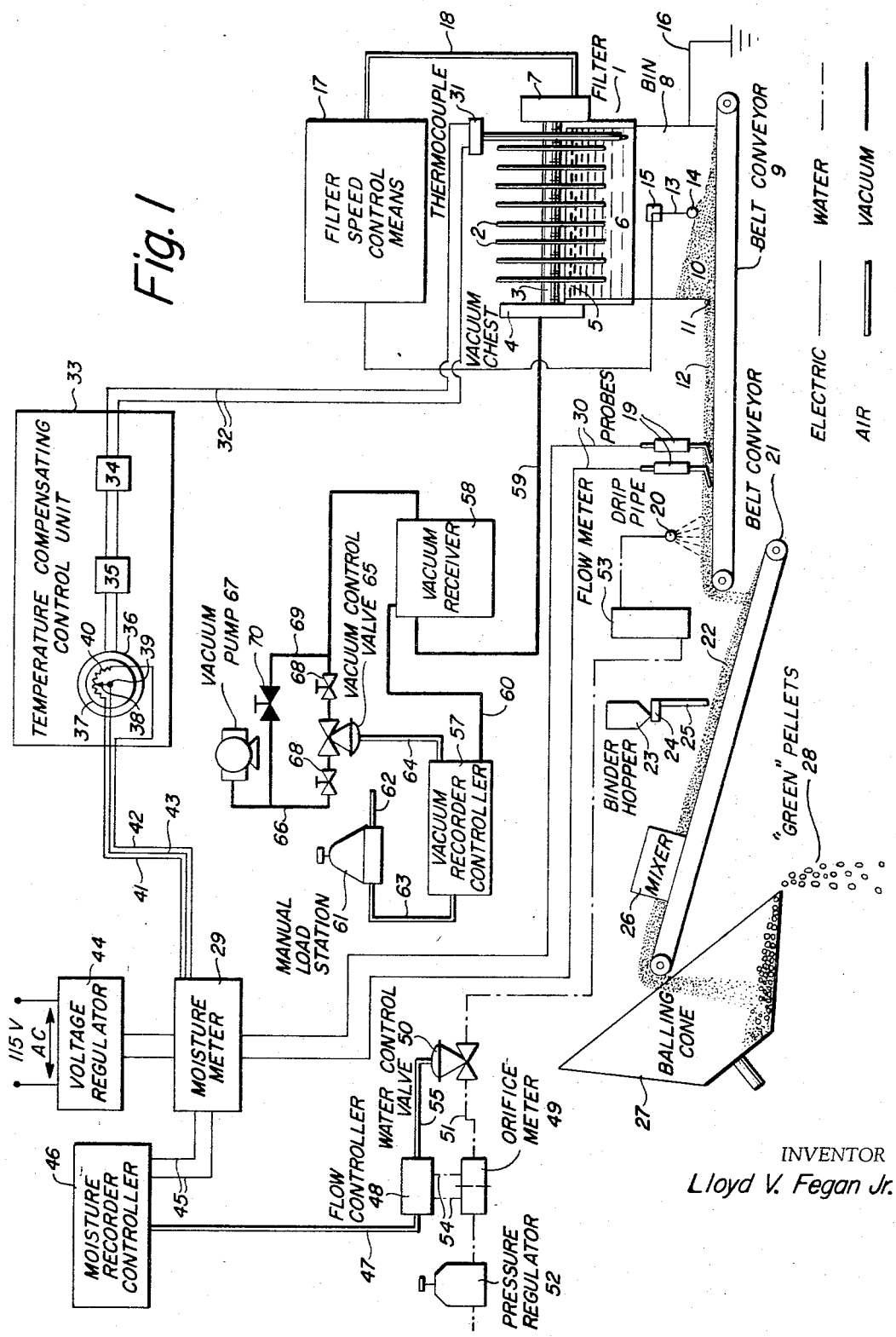

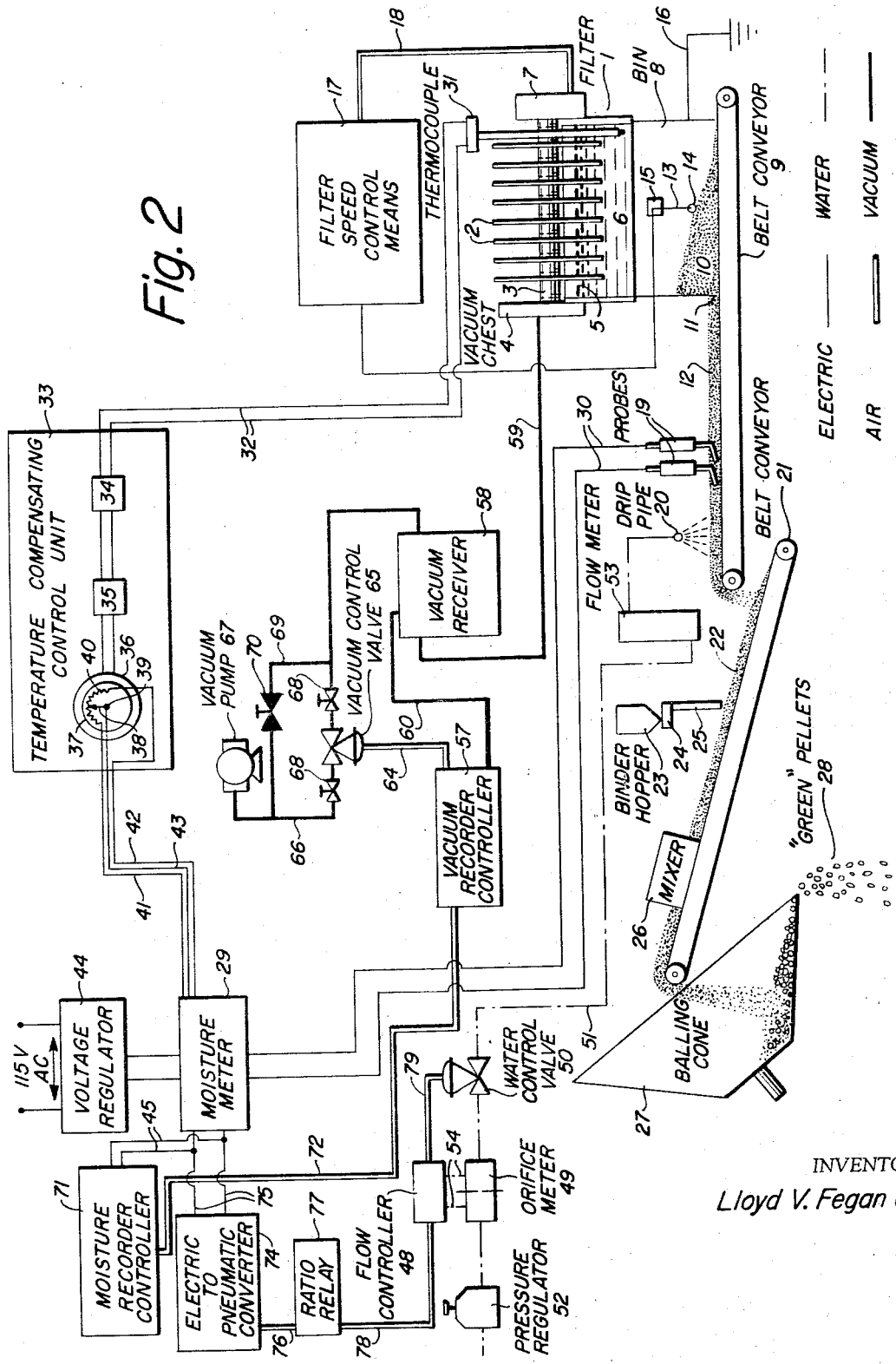

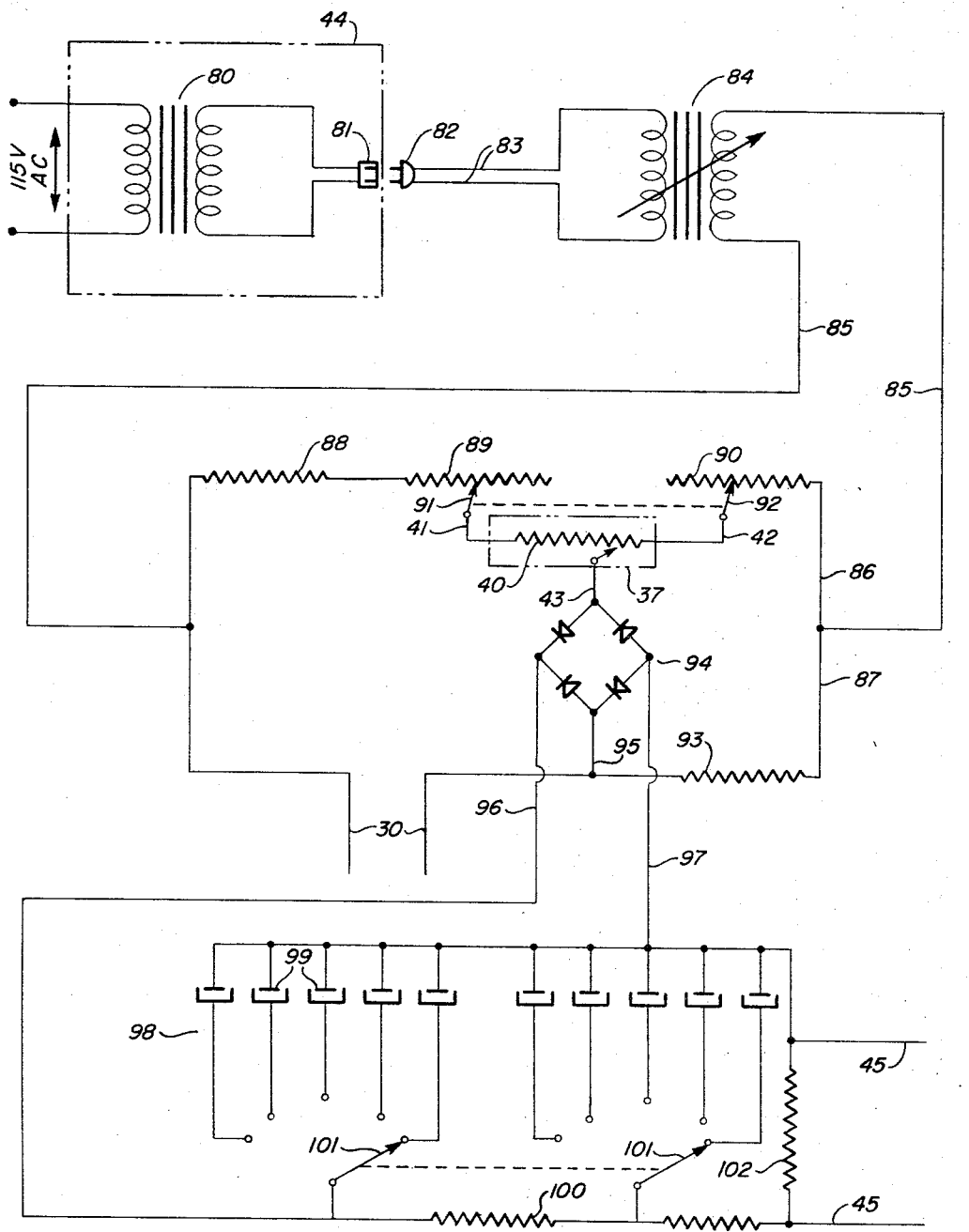

3,344,921
METHOD AND APPARATUS FOR MEASUREMENT AND CONTROL OF MOISTURE
Lloyd V. Fegan, Jr., Lebanon, Pa., assignor, by mesne assignments, to Bethlehem Steel Corporation, a corporation of Delaware
Filed Dec. 16, 1964, Ser. No. 418,814
19 Claims. (Cl. 210—67)

This invention relates generally to apparatus and method for continuously measuring and controlling the amount of moisture in a moving bed of particulate material. More particularly, this invention relates to apparatus and method for continuously measuring and controlling the amount of moisture in a moving bed of iron ore concentrate passing from a filtering operation to an agglomerating operation.

Because of the depletion of high grade iron ores in this country, the iron ore mining industry has turned its attention to the beneficiation or upgrading of the more plentiful low grade iron ores. Through such beneficiation or upgrading, the industry is able to provide a high grade uniform raw material for subsequent use in the blast furnace. Before this high grade raw material or iron ore concentrate can be used in the blast furance, it must be agglomerated into pellets in a balling drum or balling cone, the "green" pellets issuing from the drum or cone then passing to a pelletizing furnace, which may for instance be of the shaft type or of the travelling grate type, wherein the "green" pellets are heat-hardened and are then ready for shipment to and use in the blast furnace. The desirable properties of the pellets, i.e., strength, uniformity of size and resistance to deformation, are directly related to the moisture content of the iron ore concentrate before being formed into "green" pellets. Moreover, the successful operation of the drum or cone in forming the iron ore concentrate into "green" pellets also depends upon the moisture content of the iron ore concentrate feed. Thus, if the iron ore concentrate is too dry, it will "slide" in the drum or cone and will not agglomerate into pellets. In fact, the moisture content of the iron ore concentrate is quite critical and, for instance, in the balling cone, the moisture content of the iron ore concentrate feed should preferably be held to within ±0.2% of the required value for a satisfactory product.

It is essential, therefore, that the moisture content of the iron ore concentrate being agglomerated into "green" pellets be accurately measured and closely controlled and as the pelletizing process is continuous rather than batch-type, that the measurement and control of moisture content be continuous, in order that a uniformly satisfactory product may be produced.

The conductivity of the iron ore concentrate varies with its moisture content among other things; that is to say, the higher the moisture content of the iron ore concentrate, the greater will be the capacity of the iron ore concentrate to conduct electricity. The present invention utilizes conductivity measurements (or its related function, resistance) to monitor the moisture content of the iron ore concentrate, and employs a pair of horizontally spaced probes immersed in the moving bed of iron ore concentrate passing to the balling drum or cone, through which probes an electrical current is passed, the resistance of the iron ore concentrate to the passage of the electrical current between the probe being measured and interpreted as moisture content.

The use of probes per se to measure electrical resistance, and hence moisture content, in a moving bed of particulate material is not new. In fast, it is well known that the moisture content of bulk materials such as iron ore concentrates, foundry sand, coal, etc., can be determined through the measurement of the electrical resistance of these substances, and this method is today being used in industry with conventional controlling systems. However, none of these systems known today is capable of continuously and accurately measuring and closely controlling the moisture content of the moving bed of particulate material. Specifically, none of these systems known today is capable of continuously and accurately measuring and closely controlling, particularly within the close tolerance (±0.2%) hereinbefore mentioned, the moisture content of a moving bed of normally conductive particulate material such as iron ore concentrate. These conventional moisture measuring and controlling systems have been tried in the operation of agglomerating iron ore concentrate into "green" pellets, and have been found to be deficient in one respect or another.

One of the objects of this invention is to provide apparatus and method for continuously and accurately measuring and controlling the moisture content of a moving bed of particulate material.

Another object of this invention is to provide apparatus and method for continuously and accurately measuring and controlling the moisture content of a moving bed of particulate conductive material such as iron ore concentrate.

Still another object of this invention is to provide apparatus and method for continuously and accurately measuring and controlling the moisture content of a moving bed of iron ore concentrate to within ±0.2%.

Yet anothed object of this invention is to provide apparatus and method to continuously maintain a uniform bulk density in a moving bed of particulate conductive material so that the moisture content thereof can be accurately measured.

Other and further objects of this invention will become apparent during the course of the following description and by reference to the drawings and to the appended claims.

Briefly, the present invention in its apparatus aspect comprises a pair of conductivity probes immersed in a moving bed of iron ore concentrate between filter apparatus and pelletizing apparatus, with first means responsive to the measurement of said pair of probes controlling the vacuum in said filter apparatus and thereby controlling moisture content of the iron ore concentrate upstream of said pair of probes, and with second means also responsive to the measurement of said pair of probes controlling the addition of water to, and hence the moisture content of, said moving bed of iron ore concentrate downstream of said pair of probes. Briefly, the present invention, in its method aspect, comprises measuring the moisture content of a moving bed of iron ore concentrate between filter apparatus and pelletizing apparatus, providing "closed-loop" control in response to such measurement of moisture content to regulate the vacuum in the filter apparatus and hence the moisture content of the iron ore concentrate upstream of the point at which the measurement of moisture content is made, and providing "feed forward" control in response to such measurement of moisture content to regulate the addition of water to, and hence the moisture content of, the moving bed of iron ore concentrate downstream of the point at which the measurement of moisture content is made.

Referring now to the drawings, in which like numerals represent like parts in the several views:

FIGURE 1 represents a flow diagram of one embodiment of the present invention and shows diagrammatically and in vertical elevation certain of the apparatus employed therewith.

FIGURE 2 represents a flow diagram similar to FIGURE 1 and showing another embodiment of the present invention.

FIGURE 3 represents a circuit diagram of the preferred form of moisture meter, together with certain portions of related apparatus.

In the embodiment of FIGURE 1, filter 1 is a continuous vacuum rotary filter as of the "American" type (Chemical Engineers' Handbook, third edition, page 981), having filter discs 2 mounted to hollow shaft 3, and vacuum chest 4 communicating through the hollow shaft 3 with the interiors of the filter discs 2. Iron ore slurry 5 from the beneficiation operation is introduced into the filter feed tank 6 through a suitable conduit (not shown). Hollow shaft 3 and filter discs 2 connected thereto are rotated by pneumatically controlled infinitely variable speed drive 7 as of the Reeves type.

Bin 8 is mounted below filter 1, is open at its bottom, and overlies belt conveyor 9. Bin 8 receives filter cake 10 (i.e., iron ore concentrate) removed from filter discs 2, and belt conveyor 9 removes said filter cake 10 through opening 11 in one vertical wall of bin 8 whereby a bed 12 of uniform height is provided on belt conveyor 9. This bed 12 is not necessarily of uniform bulk density and, as the measurement of moisture content in bed 12 as hereinafter described is based on conductivity determinations, and as the iron ore concentrate is normally conductive, variations in bulk density in bed 12 may introduce considerable error into the measurement of the moisture content thereof. Thus, it is desired that bed 12 have substantially uniform and constant bulk density. It has been found that substantially uniform and constant bulk density may be realized by maintaining a generally triangular pile of filter cake 10 in bin 8 behind opening 11, which pile has a vertical leg adjacent the forward wall of bin 8 (i.e., the wall with opening 11 therein) of substantially constant height, and sloping downwardly at a substantially constant angle toward the rear of bin 8, and permitting belt conveyor 9 to remove filter cake 10 from bin 8 uniformly along the base of the triangular pile of filter cake 10 shown diagrammatically in FIGURE 1. To this end, means are provided to regulate the speed of rotation of filter discs 2 and, therefore, the production of filter cake 10. Such means may comprise an electrical circuit including the normally conductive filter cake 10, whereby a probe is positioned at the desired height in bin 8 at the desired distance behind the front wall thereof, contacting the surface of the triangular pile of filter cake 10 to complete an electrical circuit and reduce the speed of rotation of filter discs 2, and hence, the rate of production of filter cake 10; when the triangular pile of filter cake 10 falls below the desired height, contact between the probe and the normally conductive filter cake 10 is broken and means are thereby actuated to increase the speed of rotation of filter discs 2 and, hence, the rate of production of filter cake 10. In the preferred embodiment, free-swinging, non-rigid electrically conductive insulated cable 13, with electrically conductive weight or bob 14 secured to the end thereof, is suspended in bin 8 by means of insulated support 15. Bin 8 is indicated as electrically grounded by line 16. Filter speed control means represented diagrammatically by block 17 in FIGURE 1 communicates electrically with cable 13 and is also electrically grounded, it being understood that, in place of actual grounding connections for bin 8 and control means 17, another line may run directly from bin 8 to control means 17. When the pile of normally conductive filter cake 10 rises in bin 8, bob 14 contacts the surface thereof completing an electrical circuit including control means 17, and the latter produces a pneumatic signal transmitted to pneumatically controlled infinitely variable speed drive 7 through line 18 to reduce the speed of rotation of filter discs 2 and hence to reduce the rate of production of filter cake 10. Thereafter, when the pile of normally conductive filter cake 10 falls in bin 8, bob 14 leaves the surface thereof breaking the electrical circuit including control means 17, and the latter produces a pneumatic signal transmitted to pneumatically controlled infinitely variable speed drive 7 through line 18 to increase the speed of rotation of filter discs 2 and hence to increase the rate of production of filter cake 10. Ideally, bob 14 is constantly making and breaking contact with the surface of filter cake 10. The angle of repose of filter cake 10 is a constant and, when the position of bob 14 above belt conveyor 9 and behind the front wall of bin 8 is determined, it will be apparent that the height of the vertical leg of the triangular pile of filter cake 10 is also determined. The height of bob 14 above belt conveyor 9 should not be too great, as the filter cake 10 may feed belt conveyor 9 only from the front of the triangular pile of filter cake 10. The specific details of control means 17 are not peculiar to the present invention alone.

Downstream of bin 8, two probes 19, horizontally spaced at a fixed distance from each other, are partially immersed in bed 12 and, with apparatus hereinafter described, are adapted to continuously measure the resistance, and hence the moisture content, of the iron ore concentrate moving between the said probes 19. Downstream of probes 19, a drip pipe 20 positioned across moving bed 12 adds water thereto as needed to adjust the moisture content of the iron ore concentrate to its required value.

The bed 12 of iron ore concentrate on belt conveyor 9, after having its moisture content measured and adjusted, is discharged to an inclined belt conveyor 21, forming a bed 22 thereon. A binder, such as bentonite, is fed from hopper 23 to bed 22 at the desired rate by means of conventional rotary feeder 24 and feed pipe 25. Downstream of feed pipe 25, mixer 26 thoroughly mixes the iron ore concentrate, the binder and the water previously added. The mix is then fed into pelletizing apparatus such as a balling cone 27. As the balling cone 27 rotates, the mix agglomerates into "green" pellets 28 which are discharged from the balling cone 27 and are then passed to a pelletizing furnace (not shown) wherein they are heat-hardened for subsequent use in the blast furnace.

A moisture meter, indicated diagrammatically in FIGURE 1 by block 29 is essentially a device for continuously measuring the resistance of the bed 12 of iron ore concentrate passing between probes 19. A low voltage alternating current is passed between probes 19 through the iron ore concentrate and an output appears across a Wheatstone bridge in moisture meter 29 inversely proportional to the resistance of the said iron ore concentrate between probes 19. Moisture meter 29 is connected to probes 19 through leads 30. Variations in temperature will affect the measurement of resistance of bed 12 of iron ore concentrate, and may introduce serious errors in the determination of the moisture content thereof.

It will be apparent that variations in temperature of the iron ore concentrate in bed 12 will follow variations in the temperature of the iron ore slurry 5 in filter feed tank 6 of filter 1. To introduce a temperature correction into the measurement of resistance, and hence moisture content, of the iron ore concentrate in bed 12, thermocouple 31, indicated diagrammatically in FIGURE 1, is conveniently immersed in iron ore slurry 5 in filter feed tank 6. Leads 32 connect thermocouple 31 to a temperature compensating control unit, indicated diagrammatically by block 33 in FIGURE 1. Temperature compensating control unit 33 includes amplifier 34 amplifying the small electrical output (perhaps between 0–5 millivolts) of thermocouple 31, a relay 35 connected to power lines (not shown) and operated by the output of amplifier 34 to actuate motor 36 and potentiometer 37 preferably of the "pot" type having wiper contact 38 secured to and rotated by shaft 39 of motor 36 and resistance 40. Leads 41 and 42 connected to the ends of resistance 40, and lead 43 connected to wiper contact 38, are connected to one of the legs of the Wheatstone bridge in moisture meter 29 as shown in greater detail in FIGURE 3.

A voltage regulator, indicated diagrammatically by block 44 in FIGURE 1, and which is essentially an isolation transformer with an output voltage that remains constant despite fluctuations in input voltage, is interposed between moisture meter 29 and 115 volt A.C. power lines, whereby moisture meter 29 is powered by a stable source of alternating current and is isolated from surges which may appear in the 115 volt A.C. power supply due, for instance, to start up or stopping of heavy electrical machinery connected to the same source of current.

FIGURE 3 shows a circuit diagram of voltage regulator 44, the preferred form of moisture meter 29, and potentiometer 37, and will be described further on in this specification.

The output of moisture meter 29, which may for example range between 0–30 millivolts, is fed through leads 45 to a moisture recorder-controller, indicated diagrammatically in FIGURE 1 by block 46. Moisture recorder-controller 46 is a standard pneumatic recorder-controller device having an electrical input and a pneumatic output, preferably of the type known as "proportional," producing a pneumatic signal or output, in response to the electrical input of moisture meter 29, varying, for example, between 6–10 p.s.i. in the normal 0–15 p.s.i. instrument air range. The pneumatic output of moisture recorder-controller 46 is fed through line 47 to the set-point-adjusting input of a standard flow controller, represented diagrammatically by block 48 in FIGURE 1. An orifice meter, represented diagrammatically by block 49 in FIGURE 1, is installed in water line 51 which leads to drip pipe 20, and pressure taps 54 upstream and downstream of the orifice plate in orifice meter 49 communicate with the differential pressure inputs of said flow controller 48, thereby feeding back into said flow controller 48 a signal indicative of the actual flow rate through orifice meter 49. The pneumatic output of flow controller 48 is fed through line 55 to air-operated water control valve 50 in water line 51. A pressure regulator 52 may be placed in water line 51 before orifice meter 49, and a flow meter 53 is placed in water line 51 between water control valve 50 and drip pipe 20 for calibration purposes.

Continuing the description of the embodiment of FIGURE 1, a vacuum recorder-controller is indicated diagrammatically by block 57. Vacuum recorder-controller 57 is a standard pneumatic recorder-controller device preferably of the type known as "proportional plus reset" having a pneumatic input to adjust the set point, a process or vacuum input for the proportional control function, and a pneumatic output. Vacuum receiver or tank 58 is connected through line 59 with vacuum chest 4 of filter 1. Line 60 communicates between vacuum receiver 58 and the vacuum input for the proportional control function of vacuum recorder-controller 57. Manual load station 61 is essentially a manually operated air pressure regulating valve, served by 15 p.s.i. instrument air line 62. The output of manual load station 61 is connected through line 63 with the pneumatic input to control the set point of vacuum recorder-controller 57. The pneumatic output of vacuum recorder-controller 57 is fed through line 64 to air-operated vacuum control valve 65 in vacuum line 66 leading to vacuum receiver 58. The intake or suction of vacuum pump 67 is connected to vacuum line 66 and normally open block valves 68 are placed in vacuum line 66 on both sides of vacuum control valve 65, as shown in FIGURE 1. The position of vacuum control valve 65, which may for example be of the "butterfly" type, is regulated by the pneumatic output of vacuum recorder-controller 57 and it will be apparent that with the foregoing arrangement the degree of vacuum in vacuum chest 4 can be controlled and regulated by manual load station 61 and line 60 to regulate the extent of dewatering of the filter cake on filter discs 2. Thus, the moisture content of filter cake 10 entering bin 8 is subject to control. Vacuum receiver 58 provides vacuum capacity and acts as a sort of "flywheel" to prevent sudden and wide surges in the degree of vacuum in vacuum chest 4 and thereby to prevent similar excursions in the moisture content of the filter cake on filter discs 2.

In accordance with accepted practice, line 69 with normally closed valve 70 therein bypasses vacuum control valve 65, and in an emergency or when vacuum control valve 65 is to be removed for repairs, block valves 68 can be closed and valve 70 opened to permit continued vacuum filtering of the iron ore slurry.

It will of course be understood that moisture recorder-controller 46 and vacuum recorder-controller 57 have automatic-to-manual bypass panels by means of which the pneumatic output thereof can be adjusted manually for calibration or for control purposes in case of emergency.

The operation of the embodiment of FIGURE 1 will now be described.

The set point of vacuum recorder-controller 57 is adjusted by manual load station 61 to maintain such a degree of vacuum in vacuum chest 4 of filter 1 that the moisture content of filter cake 10 in bin 8 is only slightly below the required value. It will be appreciated by those familiar with this art that, as the filtering operation continues, the pores, in the filter discs "blind," and that a greater degree of vacuum will be required as time progresses to produce a slightly dry filter cake 10 of the same moisture content and, consequently, the set point of vacuum recorder-controller 57 will require shifting with the passage of time. All the while, the speed of rotation of filter discs 2 is controlled by filter speed control means 17 to maintain a constant quantity of filter cake 10 in bin 8. Belt conveyor 9 carrier filter cake 10 through opening 11 in bin 8 and past probes 19 which, through leads 30, introduce a low voltage alternating current through bed 12 of iron ore concentrate passing between the said probes 19. The resistance of the bed 12 of iron ore concentrate passing between probes 19 is continuously impressed on the Wheatstone bridge of moisture meter 29, as hereinafter described. At the same time, the output of thermocouple 31 actuates temperature compensating control unit 33 to introduce a temperature correction into the Wheatstone bridge of moisture meter 29. The output of moisture meter 29, which is a function of the resistance of bed 12 between probes 19 and the temperature of the slurry 5 in feed tank 6, is fed to moisture recorder-controller 46, which, in turn controls water control valve 50 in water line 51. The set point of moisture recorder-controller 46 is adjusted so that, normally, water control valve 50 permits a slight amount of water to be continuously added to bed 12 by means of drip pipe 20. Under ideal equilibrium conditions, this amount of water may be .3–.5 gallon per minute when the system is handling 30 tons per hour of iron ore concentrate. To insure a linear response of water control valve 50, to the signal from moisture recorder-controller 46, and to insure an accurate delivery of water through drip pipe 20 despite back pressures which might vary due, for instance to the plugging of holes in the drip pipe or for other reasons, flow controller 48 is interposed between moisture recorder-controller 46 and water control valve 50, and orifice meter 49 in the water line 51 feeds back to flow controller 48 information concerning the actual water flow rate in the said water line 51.

It will be apparent that, by establishing a slight flow of water from drip pipe 20 at equilibrium, a positive or negative correction to the moisture content of bed 12 can always be made, by increasing or decreasing the flow rate from drip pipe 20.

"Closed-loop" control (i.e., the circuit from probes 19 back to vacuum chest 4 of filter 1) provides a coarse delayed adjustment of moisture content in the filter cake 10 and, standing alone, would permit slugs of iron ore concentrate of incorrect moisture content to pass to balling cone 27. "Feed forward" control (i.e., the circuit from probes 19 forward to drip pipe 20) provides fine and rapid adjustment of moisture content in bed 12 but is incapable of accurately correcting large deviations of moisture content from the required value. By combining "closed-loop" control with "feed forward" control, an extremely accurate (within ± 0.1%) and reliable adjustment of moisture content is made, and there is never a slug of "off" material passing to the balling cone 27.

In that embodiment of the present invention shown in FIGURE 2, the moisture recorder-controller indicated diagrammatically by block 71 is a standard pneumatic recorder-controller device having an electrical input and a pneumatic output, preferably of the type known as "proportional plus reset," producing a pneumatic signal or output in response to the electrical input of moisture meter 29. The pneumatic output of moisture recorder-controller 71 is fed through line 72 to the pneumatic input controlling the set point of vacuum recorder-controller 57.

An electric-to-pneumatic converter is indicated diagrammatically in FIGURE 2 by block 74, and is a standard device converting an electrical input which, in this case, may range between 0–30 millivolts, to a pneumatic output in the normal instrument air pressure range (i.e., up to 15 p.s.i.). Leads 75 are connected to the electrical output of moisture meter 29 and to the electrical input of electric-to-pneumatic converter 74. The pneumatic output of electric-to-pneumatic converter 74 is fed through line 76 to a ratio relay, indicated diagrammatically by block 77.

Ratio relay 77 is a standard pneumatic proportional controller device, with a bias adjustment, having a pneumatic input fed by line 76 and an adjustable band pneumatic output connected through line 78 with the set-point-adjusting input of flow controller 48. The pneumatic output of flow controller 48 is fed through line 79 to air-operated water control valve 50.

The other elements of FIGURE 2 are the same as similarly numbered elements in FIGURE 1. It will be understood that moisture recorder-controller 71 has an automatic-to-manual bypass panel by means of which the pneumatic output thereof can be adjusted manually for calibration or control purposes in the case of emergency.

The operation of the embodiment of FIGURE 2 is essentially similar to that of FIGURE 1. However, the set point of vacuum recorder-controller 57 is not manually adjusted with the passage of time as in FIGURE 1, but rather is continuously and automatically adjusted by the output of moisture recorder-controller 71. Also, flow controller 48 operating with control valve 50 is not controlled by a moisture recorder-controller as in FIGURE 1, but rather is controlled by ratio relay 77 and electric-to-pneumatic converter 74.

FIGURE 3 shows the circuit diagram of the moisture meter 29, together with pertinent portions of related equipment.

Voltage regulator 44 (bounded by phantom lines) is seen as comprising isolation transformer 80 and receptacle 81. Plug 82 of moisture meter 29 is inserted in receptacle 81, and leads 83 connect to the primary winding of a variable transformer 84. Leads 85 connect the secondary winding of variable transformer 84 to branches 86 and 87 of a Wheatstone bridge. Branch 86 includes fixed resistance 88, adjustable rheostat 89 and 90, and potentiometer 37 (bounded by phantom lines) of temperature compensating control unit 33. Leads 41 and 42 connect between the ends of resistance 40 of potentiometer 37 and ganged wiper contacts 91 and 92 of adjustable rheostats 89 and 90, respectively, whereby calibration can be effected without changing the total resistance of branch 86 of the Wheatstone bridge, it being apparent that, during calibration, a decrease or increase in the value of either resistance 89 or 90 results in a corresponding increase or decrease, respectively, in the value of the other resistance 90 or 89. The other branch 87 of the Wheatstone bridge includes resistance 93 and the resistance of that portion of bed 12 of iron ore concentrate between probes 19, leads 30 from said probes 19 tying in to branch 87 as shown. A full-wave rectifier 94 is interposed between branches 86 and 87, being connected at one end to lead 43 of the potentiometer 37 of temperature compensating control unit 33 in branch 86, and being connected at the other end through lead 95 to branch 87 between resistance 93 and that portion of bed 12 between probes 19. The rectified output of full-wave rectifier 94 is fed through leads 96 and 97 to an adjustable filter and delay circuit 98 comprising capacitors 99, resistance 100 and ganged multi-position switches 101. The output of moisture meter 29 is then fed through lines 45 to the moisture recorder-controller 46 for the embodiment of FIGURE 1 or to the moisture recorder-controller 71 of the embodiment of FIGURE 2, shunt 102 being provided as is known in the art to permit a maximum output voltage range of 0–30 millivolts.

By means of variable transformer 84, the sensitivity and span of moisture meter 29 can be adjusted.

Potentiometer 37 of temperature compensating control unit 33 introduces a temperature correction into the Wheatstone bridge to provide greater accuracy in the measurement of moisture in the bed 12 of iron ore concentrate.

The resistance of bed 12 will usually fluctuate over short intervals of time, due to inefficient mixing of filter cake 10 in bin 8 and, in continuous moisture measurement and control, the short-interval moisture variations, which may for example be 5–30 seconds apart, should be suppressed or eliminated. Moreover, there is an interval of time elapsing between the measurement of the moisture content of a slug of iron ore concentrate in bed 12 at the probe station and the arrival of this measured slug at the drip pipe station for moisture correction. Filter and delay circuit 98 permits the selection of various combinations of capacitors 99 to provide the desired degree of damping in short-term moisture signal variations as well as to delay the moisture signal sufficiently to permit the measured slug of iron ore concentrate to pass from the probe station to the drip pipe station.

The operation of moisture meter 29 is believed to be apparent from the foregoing description. It should be noted that, if the moisture meter passed a D.C. current between probes 19, error would be introduced into the moisture measurement because of electrode polarization. The use of A.C. current with the present moisture meter eliminates this source of error.

By means of the foregoing apparatus and method, the moisture content of a moving bed of particulate material, such as iron ore concentrate passing from a filtering operation to an agglomerating operation, can be measured and controlled, reliably and accurately.

While I have shown the best embodiments of my invention now known to me, the invention is not to be considered as limited to the exact embodiments herein shown and described, but is intended to include modifications, substitutions and equivalents within the scope of the appended claims.

I claim:
1. Apparatus for continuously measuring the moisture content of a moving bed of filter cake produced by a continuous vacuum filter and for continuously maintaining the moisture content of said moving bed of filter cake substantially at a fixed value, said apparatus comprising:
 (a) first means continuously measuring the moisture content of said moving bed of filter cake downstream of said filter,
 (b) second means for continuously maintaining such a degree of vacuum in said filter as to produce a filter cake having a moisture content less than the fixed value,
 (c) third means operatively associated with said first means and continuously responsive to the measurement of moisture content in said moving bed of filter cake for continuously adding controlled amounts of water to said moving bed of filter cake downstream of said first means to continuously bring the mois- ture content of said moving bed of filter cake to the fixed value.

2. Apparatus for continuously measuring the moisture content of a moving bed of electrically conductive filter cake produced by a continuous vacuum filter and for continuously maintaining the moisture content of said moving bed of filter cake substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means for continuously maintaining such a degree of vacuum in said filter as to produce a filter cake having a moisture content less than the fixed value,
(d) third means operatively associated with said first means and continuously responsive to the electrical signal of said first means for continuously adding controlled amounts of water to said moving bed of filter cake downstream of said probes to continuously bring the moisture content of said moving bed of filter cake to the fixed value.

3. Apparatus for continuously measuring the moisture content of a material stream comprising a moving bed of electrically conductive filter cake produced by a continuous vacuum filter and for continuously maintaining the moisture content of said material stream substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means for continuously maintaining such a degree of vacuum in said filter as to produce a filter cake having a moisture content less than the fixed value,
(d) third means continuously measuring the temperature of said material stream upstream of said probes and producing an electrical signal indicative of the temperature of said material stream upstream of said probes,
(e) fourth means operatively associated with said first and third means and continuously responsive to the electrical signals of said first and third means to continuously add controlled amounts of water to said moving bed of filter cake downstream of said probes to continuously bring the moisture content of said moving bed of filter cake to the fixed value.

4. Apparatus for continuously measuring the moisture content of a moving bed of electrically conductive filter cake produced from a slurry by a continuous vacuum filter, and for continuously maintaining the moisture content of said moving bed of filter cake substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means for continuously maintaining such a degree of vacuum in said filter as to produce a filter cake having a moisture content less than the fixed value,
(d) third means continuously measuring the temperature of the slurry and producing an electrical signal indicative of the temperature of the slurry,
(e) fourth means operatively associated with said first and third means and continuously responsive to the electrical signals of said first and third means to continuously add controlled amounts of water to said moving bed of filter cake downstream of said probes to continuously bring the moisture content of said moving bed of filter cake to the desired value.

5. Apparatus for delivering a continuous stream of electrically conductive filter cake at a fixed value of moisture content, comprising:
(a) a continuous vacuum filter for receiving slurry and producing filter cake therefrom,
(b) a bin below the filter receiving filter cake therefrom, said bin having an open bottom,
(c) belt conveyor means continuously withdrawing said filter cake from said bin,
(d) a pair of horizontally spaced electrically conductive probes at least partially buried in said filter cake on said belt conveyor means,
(e) first means for passing an electric current through said probes and through the filter cake passing between the said probes to produce an electrical signal indicative of the moisture content of the filter cake passing between the probes,
(f) second means to maintain a constant level of filter cake in said bin,
(g) third means to continuously maintain such a degree of vacuum in said filter as to produce a filter cake having a moisture content less than the fixed value,
(h) fourth means operatively associated with said first means and continuously responsive to the electrical signal of said first means to continuously add controlled amounts of water to said filter cake on said belt conveyor means downstream of said probes to continuously bring the moisture content of said filter cake on said belt conveyor means to the fixed value.

6. Apparatus for delivering a continuous stream of electrically conductive filter cake at a fixed value of moisture content, comprising:
(a) a continuous vacuum filter for receiving slurry and producing filter cake therefrom,
(b) a bin below the filter receiving filter cake therefrom, said bin having an open bottom,
(c) belt conveyor means continuously withdrawing said filter cake from said bin,
(d) a pair of horizontally spaced electrically conductive probes at least partially buried in said filter cake on said belt conveyor means,
(e) first means for passing an electric current through said probes and through the filter cake passing between the said probes to produce an electrical signal indicative of the moisture content of the filter cake passing between the probes,
(f) second means to maintain a constant level of filter cake in said bin,
(g) third means to continuously maintain such a degree of vacuum in said filter as to produce a filter cake having a moisture content less than the fixed value,
(h) fourth means continuously measuring the temperature of said stream upstream of said probes and producing an electrical signal indicative of the temperature of said stream upstream of said probes,
(i) fifth means operatively associated with said first and fourth means and continuously responsive to the electrical signals of said first and fourth means to continuously add controlled amounts of water to said filter cake on said belt conveyor means downstream of said probes to continuously bring the moisture content of said filter cake on said belt conveyor means to the fixed value.

7. Apparatus for delivering a continuous stream of electrically conductive filter cake at a fixed value of moisture content, comprising:
(a) a continuous vacuum filter for receiving slurry and producing filter cake therefrom,
(b) a bin below the filter receiving filter cake therefrom, said bin having an open bottom,
(c) belt conveyor means continuously withdrawing said filter cake from said bin,
(d) a pair of horizontally spaced electrically conductive probes at least partially burned in said filter cake on said belt conveyor means,
(e) first means for passing an electric current through said probes and through the filter cake passing between the said probes to produce an electrical signal indicative of the moisture content of the filter cake passing between the probes,
(f) second means to maintain a constant level of filter cake in said bin,
(g) third means to continuously maintain such a degree of vacuum in said filter as to produce a filter cake having a moisture content less than the fixed value,
(h) fourth means continuously measuring the temperature of said slurry in said filter and producing an electrical signal indicative of the temperature of said slurry,
(i) fifth means operatively associated with said first and fourth means and continuously responsive to the electrical signals of said first and fourth means to continuously add controlled amounts of water to said filter cake on said belt conveyor means downstream of said probes to continuously bring the moisture content of said filter cake on said belt conveyor means to the fixed value.

8. Apparatus for continuously measuring the moisture content of a moving bed of filter cake produced by continuous vacuum filter and for continuously maintaining the moisture content of said moving bed of filter cake substantially at a fixed value, said apparatus comprising:
(a) first means for continuously measuring the moisture content of said moving bed of filter cake downstream of said filter,
(b) second means operatively associated with said first means and continuously responsive to the measurement of moisture content in said moving bed of filter cake to continuously maintain such a degree of vacuum in said filter as to produce a filter cake having a moisture content less than the fixed value,
(c) third means operatively associated with said first means and continuously responsive to the measurement of moisture content in said moving bed of filter cake to continuously add controlled amounts of water to said moving bed of filter cake downstream of said first means to continuously bring the moisture content of said moving bed of filter cake to the fixed value.

9. Apparatus for continuously measuring the moisture content of a moving bed of electrically conductive filter cake produced by a continuous vacuum filter and for continuously maintaining the moisture content of said moving bed of filter cake substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means operatively associated with said first means and continuously responsive to the electrical signal of said first means to continuously maintain such a degree of vacuum in said filter as to produce a filter cake having a moisture content less than the fixed value,
(d) third means operatively associated with said first means and continuously responsive to the electrical signal of said first means to continuously add controlled amounts of water to said moving bed of filter cake downstream of said probes to continuously bring the moisture content of said moving bed of filter cake to the fixed value.

10. Apparatus for continuously measuring the moisture content of a material stream comprising a moving bed of electrically conductive filter cake produced by a continuous vacuum filter and for continuously maintaining the moisture content of said material stream substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means continuously measuring the temperature of said material stream upstream of said probes and producing an electrical signal indicative of the temperature of said material stream upstream of said probes,
(d) third means operatively associated with said first and second means and continuously responsive to the electrical signals of said first and second means to continuously maintain such a degree of vacuum in said filter as to produce a filter cake having a moisture content less than the fixed value,
(e) fourth means operatively associated with said first and second means and continuously responsive to the electrical signals of said first and second means to continuously add controlled amounts of water to said moving bed of filter cake downstream of said probes to continuously bring the moisture content of said moving bed of filter cake to the fixed value.

11. Apparatus for continuously measuring the moisture content of a moving bed of electrically conductive filter cake produced from a slurry by a continuous vacuum filter, and for continuously maintaining the moisture content of said moving bed of filter cake substantially at a fixed value, said apparatus comprising:
(a) a pair of horizontally spaced electrically conductive probes at least partially buried in said moving bed of filter cake downstream of said filter,
(b) first means for continuously passing an electrical current through said probes and through that portion of the moving bed of filter cake passing between the said probes to produce an electrical signal indicative of the moisture content of said moving bed of filter cake passing between said probes,
(c) second means continuously measuring the temperature of the slurry and producing an electrical signal indicative of the temperature of the slurry,
(d) third means operatively associated with said first and second means and continuously responsive to the electrical signals of said first and second means to continuously maintain such a degree of vacuum in said filter as to produce a filter cake having a moisture content less than the fixed value,
(e) fourth means operatively associated with said first and second means and continuously responsive to the electrical signals of said first and second means to continuously add controlled amounts of water to said moving bed of filter cake downstream of said probes to continuously bring the moisture content of said moving bed of filter cake to the desired value.

12. Apparatus for delivering a continuous stream of electrically conductive filter cake at a fixed value of moisture content, comprising:
  (a) a continuous vacuum filter for receiving slurry and producing filter cake therefrom,
  (b) a bin below the filter receiving filter cake therefrom, said bin having an open bottom,
  (c) belt conveyor means continuously withdrawing said filter cake from said bin,
  (d) a pair of horizontally spaced electrically conductive probes at least partially buried in said filter cake on said belt conveyor means,
  (e) first means for passing an electric current through said probes and through the filter cake passing between the said probes to produce an electrical signal indicative of the moisture content of the filter cake passing between the probes,
  (f) second means to maintain a constant level of filter cake in said bin,
  (g) third means operatively associated with said first means and continuously responsive to the electrical signal of said first means to continuously maintain such a degree of vacuum in said filter as to produce a filter cake having a moisture content less than the fixed value,
  (h) fourth means operatively associated with said first means and continuously responsive to the electrical signal of said first means to continuously add controlled amounts of water to said filter cake on said belt conveyor means downstream of said probes to continuously bring the moisture content of said filter cake on said belt conveyor means to the fixed value.

13. Apparatus for delivering a continuous stream of electrically conductive filter cake at a fixed value of moisture content, comprising:
  (a) a continuous vacuum filter for receiving slurry and producing filter cake therefrom,
  (b) a bin below the filter receiving filter cake therefrom, said bin having an open bottom,
  (c) belt conveyor means continuously withdrawing said filter cake from said bin,
  (d) a pair of horizontally spaced electrically conductive probes at least partially buried in said filter cake on said belt conveyor means,
  (e) first means for passing an electric current through said probes and through the filter cake passing between the said probes to produce an electrical signal indicative of the moisture content of the filter cake passing between the probes,
  (f) second means to maintain a constant level of filter cake in said bin,
  (g) third means continuously measuring the temperature of said stream upstream of said probes and producing an electrical signal indicative of the temperature of said stream upstream of said probes,
  (h) fourth means operatively associated with said first and third means and continuously responsive to the electrical signals of said first and third means to continuously maintain such a degree of vacuum in said filter as to produce a filter cake having a moisture content less than the fixed value,
  (i) fifth means operatively associated with said first and third means and continuously responsive to the electrical signals of said first and third means to continuously add controlled amounts of water to said filter cake on said belt conveyor means downstream of said probes to continuously bring the moisture content of said filter cake on said belt conveyor means to the fixed value.

14. Apparatus for delivering a continuous stream of electrically conductive filter cake at a fixed value of moisture content, comprising:
  (a) a continuous vacuum filter for receiving slurry and producing filter cake therefrom,
  (b) a bin below the filter receiving filter cake therefrom, said bin having an open bottom,
  (c) belt conveyor means continuously withdrawing said filter cake from said bin,
  (d) a pair of horizontally spaced electrically conductive probes at least partially buried in said filter cake on said belt conveyor means,
  (e) first means for passing an electric current through said probes and through the filter cake passing between the said probes to produce an electrical signal indicative of the moisture content of the filter cake passing between the probes,
  (f) second means to maintain a constant level of filter cake in said bin,
  (g) third means continuously measuring the temperature of said slurry in said filter and producing an electrical signal indicative of the temperature of said slurry,
  (h) fourth means operatively associated with said first and third means and continuously responsive to the electrical signals of said first and third means to continuously maintain such a degree of vacuum in said filter as to produce a filter cake having a moisture content less than the fixed value,
  (i) fifth means operatively associated with said first and third means and continuously responsive to the electrical signals of said first and third means to continuously add controlled amounts of water to said filter cake on said belt conveyor means downstream of said probes to continuously bring the moisture content of said filter cake on said belt conveyor means to the fixed value.

15. Apparatus for measuring and bringing to a desired value the moisture content of particulate material to be supplied to a treating apparatus, comprisnig:
  (a) means for conveying past a fixed point a bed of said material having a moisture content lower than that desired,
  (b) means for maintaining the bulk density of said bed uniform,
  (c) means at said fixed point for electrically measuring the moisture content of said bed,
  (d) means responsive to said measurement for adding to said bed moisture in an amount sufficient to bring to the desired value the moisture content of said bed.

16. Apparatus for continuously measuring and bringing to a desired value the moisture content of electrically conductive particulate material to be supplied to a treating apparatus, comprising:
  (a) first means for conveying past a fixed point a bed of said material having a moisture content lower than that desired,
  (b) second means for maintaining at a substantially uniform value the bulk density of said bed of material passing said fixed point,
  (c) third means for electrically measuring the moisture content of said bed of material at said fixed point,
  (d) fourth means operatively associated with said third means and continuously responsive to the measurement of moisture content by said third means to continuously add controlled amounts of water to said bed of material downstream of said probes to continuously bring the moisture content of said bed of material to the desired value.

17. Apparatus for measuring and bringing to a desired value the moisture content of electrically conductive particulate material to be supplied to a treating apparatus, comprising:
  (a) a vacuum filter, (b) means for supplying a slurry of said material to said filter,
(c) means for conveying past a fixed point the output of said filter in the form of a bed,
(d) electrical means at said fixed point for measuring the moisture content of said bed,
(e) means responsive to said measurement of moisture content for controlling the degree of vacuum in said filter to reduce the moisture content of said slurry to a value below the desired value,
(f) means varying the speed of said filter to maintain the bulk density of said bed uniform, and
(g) means responsive to said measurement of moisture content to add to said bed moisture in an amount sufficient to bring to the desired value the moisture content of said bed.

18. The method of continuously maintaining the moisture content of a moving bed of filter cake produced by a continuous vacuum filter substantially at a fixed value, said method comprising:
   (a) maintaining such a degree of vacuum in the filter as to produce a filter cake having a moisture content less than the fixed value,
   (b) continuously measuring the moisture content of said moving bed of filter cake downstream of said filter,
   (c) continuously adding controlled amounts of water to the moving bed of filter cake downstream of the point at which the measurement of moisture content of said moving bed of filter cake is made, in response to such continuous measurement of moisture content to bring the moisture content of said moving bed of filter cake to the fixed value.

19. The method of continuously maintaining the moisture content of a moving bed of filter cake produced by a continuous vacuum filter substantially at a fixed value, said method comprising:
   (a) continuously measuring the moisture content of said moving bed of filter cake downstream of said filter,
   (b) maintaining such a degree of vacuum in the filter in response to such continuous measurement of moisture content as to produce a filter cake having a moisture content less than the fixed value,
   (c) continuously adding controlled amounts of water to the moving bed of filter cake downstream of the point at which the measurement of moisture content of said moving bed of filter cake is made, in response to such continuous measurement of moisture content to bring the moisture content of said moving bed of filter cake to the fixed value.

No references cited.

SAMIH N. ZAHARNA, *Primary Examiner.*